R. T. & F. T. JONES.
BRAKE VALVE CONTROLLING DEVICE FOR VEHICLES.
APPLICATION FILED JUNE 28, 1911.
1,046,391.
Patented Dec. 3, 1912.
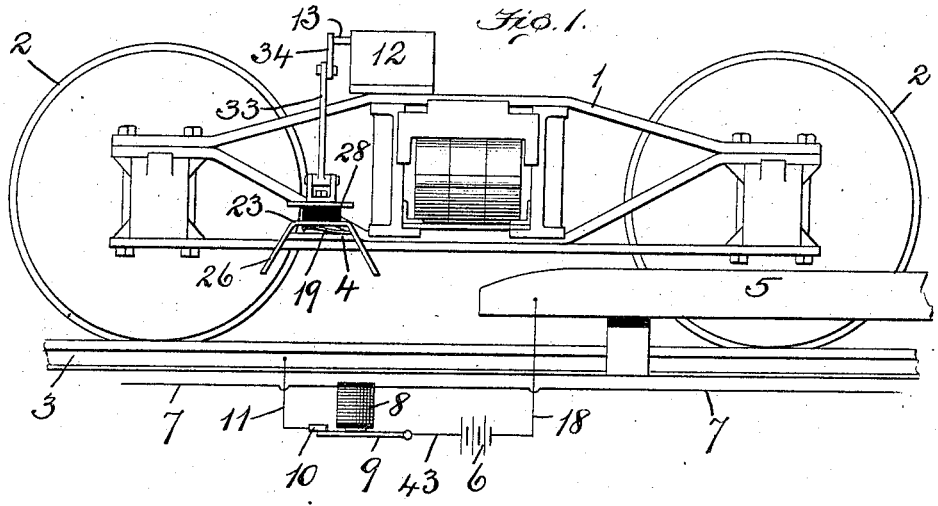
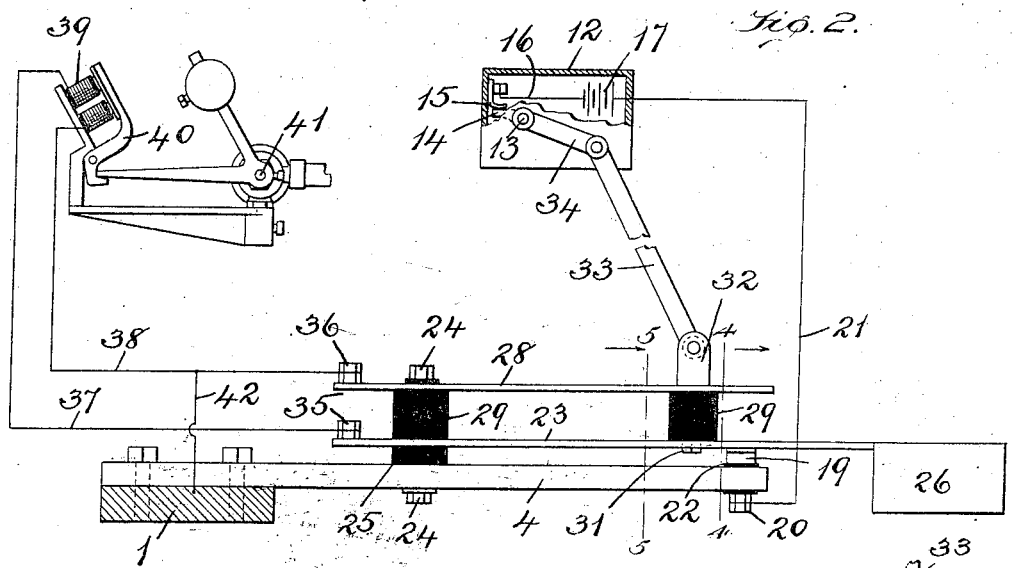
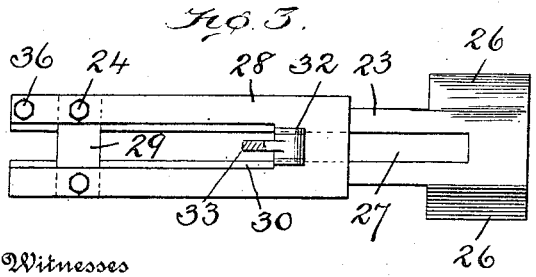
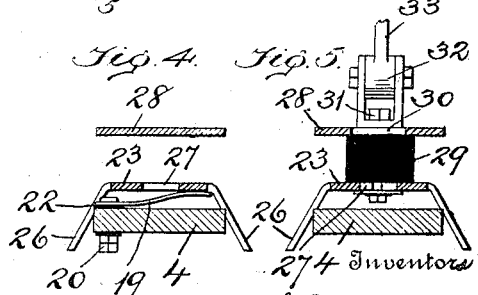
Witnesses
Edwin L. Bradford
G. Ferd. Vogt
Inventors
Richard T. Jones
Frank T. Jones
By
Mann & Co.
Attorneys

UNITED STATES PATENT OFFICE.

RICHARD T. JONES AND FRANK T. JONES, OF BALTIMORE, MARYLAND, ASSIGNORS TO THE JONES SAFETY TRAIN CONTROL SYSTEM COMPANY, OF BALTIMORE, MARYLAND, A CORPORATION OF MARYLAND.

BRAKE-VALVE-CONTROLLING DEVICE FOR VEHICLES.

1,046,391. Specification of Letters Patent. Patented Dec. 3, 1912.

Application filed June 28, 1911. Serial No. 635,758.

*To all whom it may concern:*

Be it known that we, RICHARD T. JONES and FRANK T. JONES, citizens of the United States, residing at Baltimore, in the State of Maryland, have invented certain new and useful Improvements in Brake-Valve-Controlling Devices for Vehicles, of which the following is a specification.

This invention relates to improvements in train-controlling mechanism and has particular reference to an improved arrangement of contact, circuits and controlling devices for valves on the vehicle.

The present invention is designed especially for use in a train-controlling system like that shown and described in the pending application for patent to R. T. and F. T. Jones, Serial No. 570,552, filed July 6, 1910, wherein the roadway is provided at intervals with short or ramp rails with which the improved contact coacts as it passes so as to pick up a current, provided the track ahead is clear, which is substituted for another current on the vehicle that is broken upon the engagement of the contact with the said short or ramp rails.

The accompanying drawing illustrates the invention wherein—

Figure 1, shows a side elevation of a vehicle truck and a portion of the roadway including a part of a ramp rail. Fig. 2, is a diagrammatic view of the contact, the valve on the vehicle and its controlling device and the circuits which control the same. Fig. 3, is a plan view of the contact device, Fig. 4, a vertical cross-section through the contact on the line 4—4 of Fig. 2, and Fig. 5, another vertical cross-section on the line 5—5 of Fig. 2.

Referring to the drawing the numeral, 1, designates a truck frame of the vehicle and, 2, the wheels thereof which travel on the rails, 3. A plate, 4, is rigidly secured to and extends horizontally from the lower bar of the truck frame and extends outwardly from the said frame so as to form a support for the contact or shoe which will presently be described.

In the system in which this device is employed the roadway is provided at intervals, or near the entrance to each block, with short or ramp rails, 5, which are preferably supported in an elevated position at the side of one of the track rails, 3, and each ramp rail is in electrical connection with a battery or source of electric current supply, 6, by means of a wire, 18. When the block ahead is clear an electric circuit therefrom is formed which includes a wire, 7, and an electro-magnet, 8, which latter is maintained in an energized condition as long as said block ahead is clear, so that an armature, 9, will be held by the magnet in engagement with a contact, 10, that is connected by a wire, 11, with one of the track rails, 3. Thus it will be understood that while the block ahead is clear the ramp rail, 5, will be connected with one side of the battery, 6, and the track rail, 3, will be electrically connected with the other side of the battery, while devices on the vehicle are provided to connect the ramp rail and the track rail while the vehicle contact is traveling over the ramp rail substantially as explained in pending application Serial Number 570,552, filed July 6th, 1910.

The truck frame of the vehicle sustains a case, 12, which carries a short horizontal shaft, 13, and on which a contact arm, 14, is mounted so as to swing as the shaft is oscillated. A contact plate, 15, is carried on the wall of the case so that the arm, 14, will normally contact therewith, and a wire, 16, extends between the plate and one side of a battery, 17, that is inclosed in the case.

The horizontal plate, 4, that projects from the truck frame has a contact plate, 19, at its outer end and a binding post, 20, is provided on said contact so that a wire, 21, therefrom may electrically connect the plate with the battery, 17, in the case, 12. By reference to Fig. 4 it will be seen that the contact plate, 19, is insulated by suitable material, 22, from the plate, 4.

On top of plate, 4, we provide a horizontally-extending spring shoe plate, 23, whose rear end is rigidly secured to the plate, 4, by means of a bolt, 24. A block of insulating material, 25, is interposed between the plate, 4, and the shoe plate, 23, to electrically separate the two. This shoe plate extends over the plate, 4, and projects beyond the outer end of the latter and said projecting end has down-turned opposite edges or flanges, 26, which are so positioned that they will ride or scrape over the successive ramp rails, 5, as the vehicle passes the latter.

By reference to Fig. 2, it will be seen that the bottom side of the shoe plate normally rests upon the contact plate, 19, and is thus electrically connected with the battery, 17, in case, 12. By reference to Figs. 3, 4 and 5, it will also be seen that the shoe plate, 23, is provided with a longitudinal slot, 27, which extends from the inner secured end of the plate to the outer end thereof and terminates in said outer end between the opposite edges or flanges, 26.

Above the shoe plate, 23, we provide a spring plate, 28, and the two plates are electrically separated by means of blocks of insulation, 29, and this latter plate, 28, is also provided with a longitudinal slot, 30, which extends from its inner end and toward the outer end. The outer end of this spring plate is provided with a bolt, 31, that mechanically connects the same with the shoe plate beneath it but said bolt is insulated from the shoe plate so that it will not electrically connect the two plates. On top of the spring plate, 28, we attach a coupling, 32, to the upper end of the bolt, 31, and a rod, 33, has its lower end pivotally engaging said coupling and its upper end pivotally connected with a rock arm, 34, on the shaft, 13, in the case, 12.

By reference to Fig. 2, it will be noted that the inner ends of plates, 23, and, 28, are provided with binding posts, 35, and, 36, respectively, and that wires, 37, and, 38, extend from said posts and connect with the suitable electro-magnets, 39, on the vehicle. These magnets control an armature, 40, which in turn serves to retain a valve, 41, on the vehicle in a normally inoperated position. The valve is arranged in the air brake system of the vehicle so that when released by the deënergization of the magnets, 39, and the release of armature, 40, a venting of the train line will be effected to apply the brakes.

From the foregoing explanation it may be seen that a normal circuit is maintained on the vehicle between battery, 17, to electro-magnets, 39, as follows: from one side of battery, 17, by wire, 16; contact, 15; arm, 14; shaft, 13, rock-arm, 34, and rod, 33, to coupling, 32, then by spring plate, 28; post, 36, and wire, 38, to electro-magnets, 39, and then return by wire, 37, post, 35, shoe plate, 23, and contact, 19, to post, 20, and finally by wire, 21, back to the other side of the battery. This circuit is maintained as long as shoe plate remains on contact, 19, which is during the period that the vehicle is traveling after leaving one ramp rail, 5, and until the next ramp rail is reached. When a ramp rail is reached however, the flanges, 26, of the shoe plate will ride up on said rail and thereby raise the free end of the shoe plate from the contact, 19, thus breaking the normal circuit between battery, 17, and the electromagnets, 39, and would cause a deënergization of said electro-magnets unless a substitute circuit had not in the meantime been provided for said magnets to prevent their deënergization. If, therefore, the block ahead is clear the electro-magnet, 8, will be energized and the armature, 9, will maintain an electrical connection between one side of the battery, 6, and one of the track rails, 3, while the wire, 18, will connect the other side of said battery, 6, with the ramp rail, 5. Under such conditions (the track ahead clear) the flanges, 26, of the shoe-plate, 23, will form a connection with the ramp rail before the connection between said shoe plate and the contact, 19, is broken so that when the latter connection is broken by the raising of the shoe plate the current from battery, 6, will pass to electro-magnets, 39, by wire, 18, ramp rail, 5, shoe plate, 23, and wire, 37, while the return circuit will be established from the electro-magnets by wire, 38, short wire, 42, to the truck frame, 1, then through the axle and wheels, 2, to the track-rail, 3, and by wire, 11, contact, 10, armature, 9, and wire, 43, back to said battery, 6. It will therefore be understood that, if the track ahead is clear when the shoe-plate, 23, is raised by contact with a ramp rail, that while the normal vehicle circuit from battery, 17, will be momentarily interrupted, another circuit from battery, 6, will be substituted and the electro-magnets, 39, maintained in an energized condition by said battery, 6. As the raising of the shoe plate, 23, actuates rod, 33, the movement of the latter will rock shaft, 13, and move arm, 14, from plate, 15, thus breaking the circuit at that point as well as between shoe plate and contact, 19. This construction also insures that in case the rod, 33, should become broken the normal vehicle circuit from battery, 17, will at once be interrupted and the magnets, 39, deënergized, resulting in an application of the brakes.

By providing the case, 12, the battery, 17, and the contacts, 15, and 14, therein will be protected against the weather and better results thereby obtained.

Having thus described our invention what we claim and desire to secure by Letters Patent is,—

1. In a train-controlling valve mechanism for use on railways having track rails and a ramp rail, the combination with a vehicle having an air-brake valve; an electro-magnet on the vehicle for normally holding the valve in one position; a contact also on the vehicle which is provided with a shoe plate to wipe over and be moved by the ramp rail as the vehicle passes the latter; a contact plate with which the shoe plate normally contacts; a movable plate at one side of and electrically insulated from but mechanically connected to the shoe plate to be moved as the shoe plate passes over the said ramp rails; a source of electric energy on the vehicle; an electrical connection normally between one side of the source of energy on the vehicle and the contact plate with which the shoe plate normally contacts; a connection between the other side of the source of energy on the vehicle and the said movable plate, said latter connection including separable connections which are separated as the shoe plate is moved by a ramp rail, and an electrical connection between the shoe plate and the movable plate said latter connection including the said electro-magnet on the vehicle to normally keep the latter energized and hold the air-brake valve in the inoperative position.

2. The combination with a vehicle having an air-brake with an air-brake valve to control the air-brakes, of an electro-magnet on the vehicle to normally engage and hold the air-brake valve in an inoperative position; a movable contact shoe carried by the vehicle; a movable plate at one side of the shoe,—said shoe and plate being mechanically connected but electrically insulated from each other; electric connections from the shoe through the electro-magnet and to the movable plate; a source of electric energy on the vehicle; electric connections between one side of the said source of energy and the shoe; mechanical means to electrically connect the other side of the said source of energy and the said movable plate,—said latter connections including a movable contact to normally make the electrical connection between the said source of energy and the said movable plate, whereby when the shoe is in the normal inoperative position a circuit will be maintained from the source of energy on the vehicle through the said electro-magnet and which circuit will be interrupted upon the movement of the shoe and movable plate.

3. The combination with a vehicle having an air-brake valve, of an electro-magnet on the vehicle to normally engage and hold the valve in one position; a shoe-plate having a movable contact end; connections between the electro-magnet and the shoe-plate; a source of electric energy on the vehicle; means for normally electrically connecting the movable end of the shoe plate and one side of the said source of energy; a contact plate; an electrical connection between the other side of the said source of energy and the said contact plate; a movable arm to co-act with the said contact plate; means for mechanically connecting the said movable arm and the shoe whereby the movement of the shoe will operate the arm,—said means being insulated from the shoe and electric connections between the electro-magnet and the said mechanically-connecting means between the arm and shoe.

4. The combination with a vehicle having an air-brake valve, of an electro-magnet on the vehicle to normally engage and hold the valve in one position; a shoe plate having one end movable; a movable plate at the side of the shoe plate and mechanically connected thereto but electrically insulated therefrom; a source of electric energy on the vehicle; means for normally electrically connecting one side of the said source of energy and the movable end of the shoe plate; a contact plate in electric connection with the other side of the said source of energy; an arm to engage said latter contact plate; levers connecting the arm with the movable plate at the side of the shoe plate; connections between the movable plate and the electro-magnet and connections between the electro-magnet and the shoe plate.

In testimony whereof we affix our signatures in presence of two witnesses.

RICHARD T. JONES.
FRANK T. JONES.

Witnesses:
G. FERD. VOGT,
CHARLES B. MANN, Jr.

---

Copies of this patent may be obtained for five cents each, by addressing the "Commissioner of Patents, Washington, D. C."